Feb. 13, 1940. C. BASHAM 2,190,005
HONING CRANK FOR MOWERS
Filed June 26, 1939
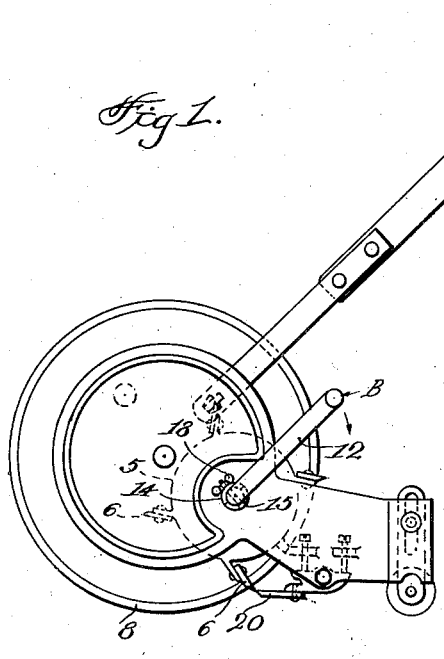
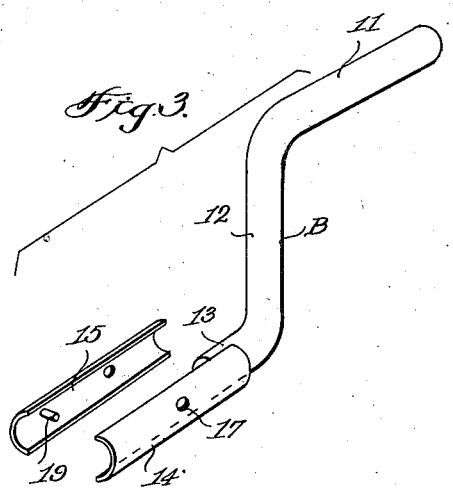
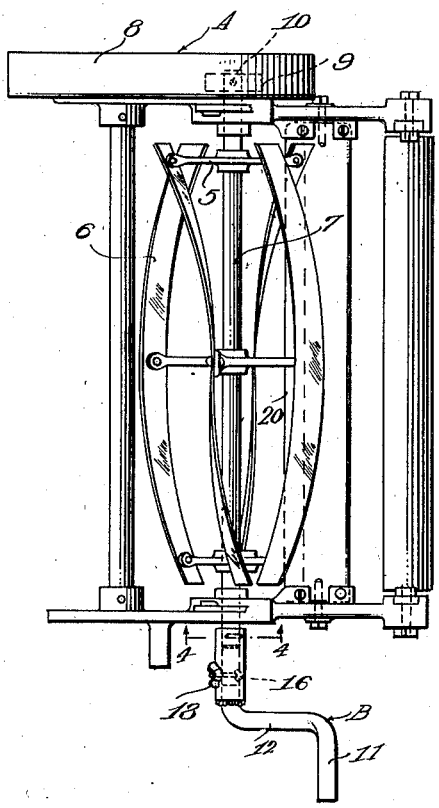
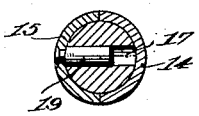
Clement Basham
INVENTOR
BY Victor J. Evans & Co.
ATTORNEYS Patented Feb. 13, 1940

2,190,005

UNITED STATES PATENT OFFICE 2,190,005

HONING CRANK FOR MOWERS

Clement Basham, Fort Worth, Tex.

Application June 26, 1939, Serial No. 281,258

1 Claim. (Cl. 74—545)

The invention relates to a crank and more especially to honing cranks for lawn mowers.

The primary object of the invention is the provision of a device of this character wherein the same can be attached to the operating shaft of a cutter reel of a lawn mower so that the blades or cutters of this reel can be readily and easily honed or sharpened through the use of an abrasive mixture applied to the said blades or cutters and on operating the crank.

Another object of the invention is the provision of a device of this character wherein its construction is novel and enables the quick separable connection thereof with a cutting reel of a lawn mower so that such reel can be manually turned for honing or sharpening purposes of the cutters thereof, the cutters being in the form of spiral cutting blades of standard construction.

A further object of the invention is the provision of a device of this character which is extremely simple in construction, thoroughly reliable and effective in operation, enabling the honing or sharpening of a lawn mower with dispatch and at minimum expense and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention and pointed out in the claim hereunto appended.

In the accompanying drawing:

Figure 1 is a fragmentary side elevation of a lawn mower showing certain standard parts thereof removed and the device constructed in accordance with the invention applied for honing or sharpening purposes.

Figure 2 is a plan view.

Figure 3 is an exploded perspective view of the device per se;

Figure 4 is a sectional view taken on the line 4—4 of Figure 2 looking in the direction of the arrows.

Similar reference characters indicate corresponding parts throughout the several views in the drawing.

Referring to the drawing in detail, A designates generally a lawn mower of conventional construction involving a rotative cutting reel 5 having the spiral cutting blades 6 as usual and this reel is fixed to a driven shaft or axle 7 being operated at each end through connection with a ground wheel 8 while B denotes generally the crank constituting the present invention and hereinafter fully described.

To enable the use of the crank B for the sharpening or honing of the lawn mower A it is necessary to remove one of the ground wheels 8 and detach from the shaft or axle 7 the pinion 9 coacting with the ground wheel, this being effected by removing the fastening pin 10 connecting said pinion with the axle or shaft 7. Thus one end of the axle or shaft 7 is exposed for the application of the crank B and after application it is necessary to lift the lawn mower A so that the wheel 8 remaining intact will be out of contact with a support and thus rotary motion can be imparted to the reel 5 carrying the cutting blades 6, the honing or sharpening of these blades being hereinafter described.

The crank B comprises a handle 11 formed with a crank portion 12 having integral therewith or permanently attached thereto at the end 13 thereof a section 14 of a split coupling sleeve, the other companion section 15 of the same being separably fastened to the section 14 by a cross clamping bolt 16 which is passed through openings 17 in said sections 14 and 15 and carries a wing nut 18, these sections 14 and 15 being shown together in their clamping relationship in Figure 2 of the drawing.

The section 15 has a dowel pin or locking lug 19 which projects inwardly from said section and is adapted to be accommodated in the opening in the shaft 7 for the fastener 10 that attaches the pinion 9 thereto when the latter has been removed from the said shaft. In this way the crank B is separably fastened to the shaft 7 so that hand rotation of this shaft can be had.

In the use of the crank B when attached to the shaft 7 to enable the sharpening or honing of the lawn mower A it is necessary to apply an abrasive compound or mixture, preferably including comminuted carborundum or other suitable abrasive material to the cutting edges of the blade 6 and also to the corelated fixed cutter bar 20 of the mower so that when the reel 5 is rotated a sharpening or honing action will be set up between the blades 6 and the bar 20. It is of course required that the blades 6 have true contact throughout their extent with the cutting heads of the fixed bar 20 of the mower, the latter being susceptible of adjustment for truing purposes.

When the blades 6 and the bar 20 have been honed or sharpened the crank B is detached from the shaft 7 and thereafter the removed wheel 8 and the pinion 9 are replaced on the mower A and the latter is now ready for service.

The split coupling sleeve including the sections 14 and 15 is of elongated tubular formation and the section 15 is readily detachable or separable from the section 14. Thus the crank B can be readily attached to and removed from the shaft 7 with dispatch and when attached enables the hand rotation of the reel 5 for the purpose before stated.

What is claimed is:

A crank for fitting a lawn mower cutting reel shaft having a transverse opening for a fastener separably securing a pinion to said shaft when within a lawn mower frame, comprising a longitudinally split two-part tubular sleeve for embracing said shaft, a lug projecting inwardly from one of the parts of said sleeve and accommodated in the opening in said shaft, a removable fastener passed transversely through the two parts of said sleeve for holding the lug engaged in the opening in said shaft, and a cranking handle having turning stud terminal, the turning stud terminal being joined with the other part of said sleeve for axial alignment with the shaft in end to end abutment therewith when the sleeve is fastened about the said shaft with the lug engaged in the opening therein, the said fastener joining the two parts of the sleeve together, being disposed next to the stud of said handle and beyond the said shaft when the sleeve is engaged therewith.

CLEMENT BASHAM.